Dec. 27, 1938.  F. H. HOPKINS  2,141,211
GAUGE
Filed May 10, 1937  3 Sheets-Sheet 1
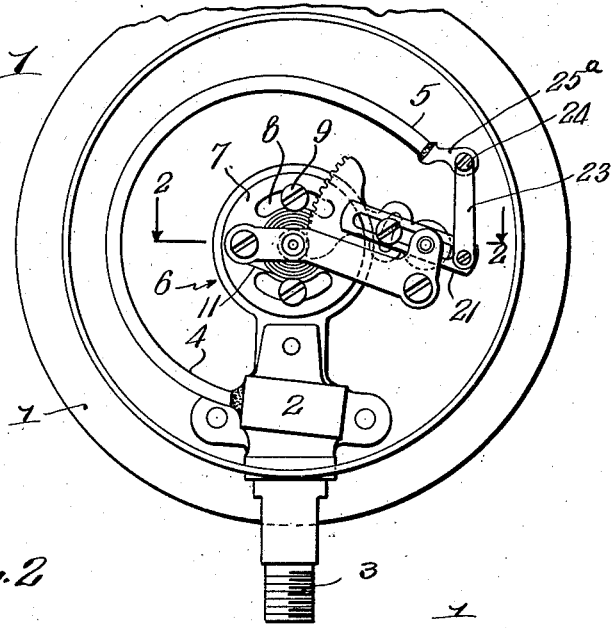
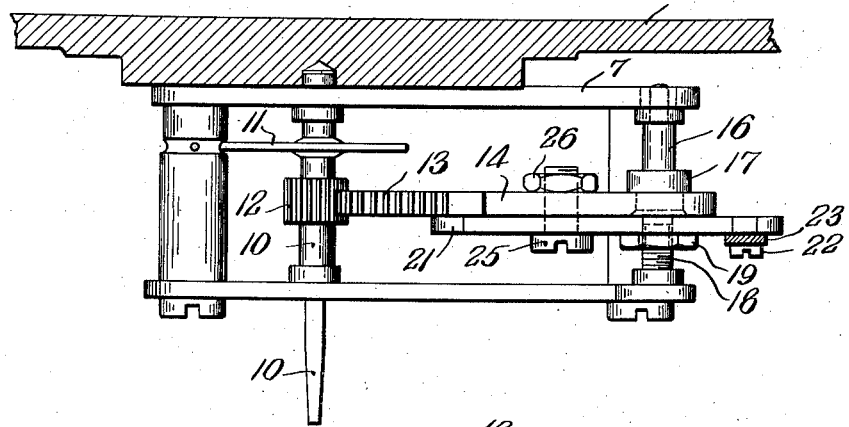
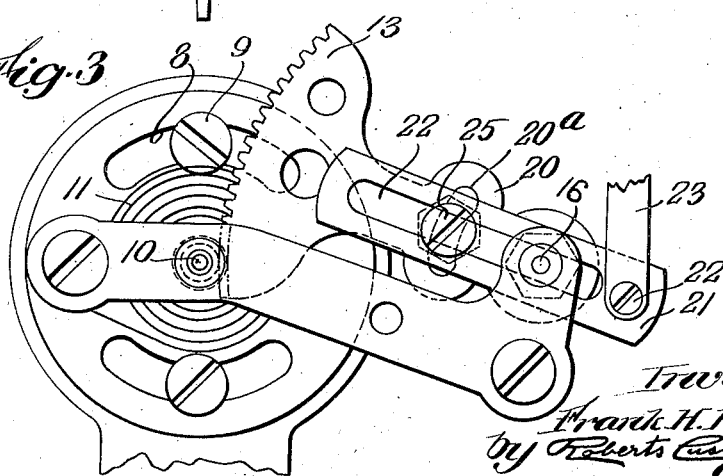
Inventor:
Frank H. Hopkins
by Roberts Cushman & Woodberry
Attys.

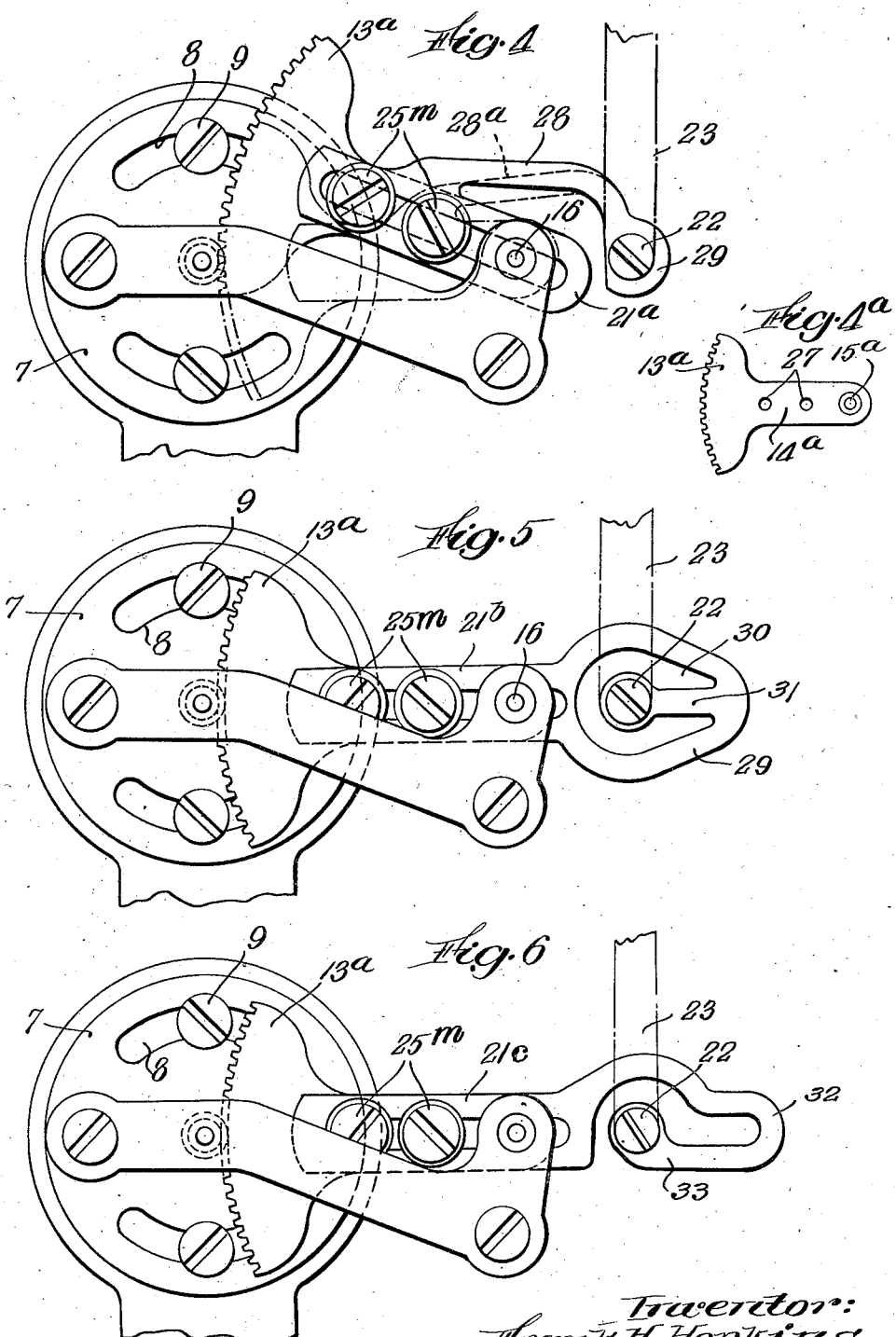

Dec. 27, 1938.  F. H. HOPKINS  2,141,211
GAUGE
Filed May 10, 1937   3 Sheets-Sheet 3
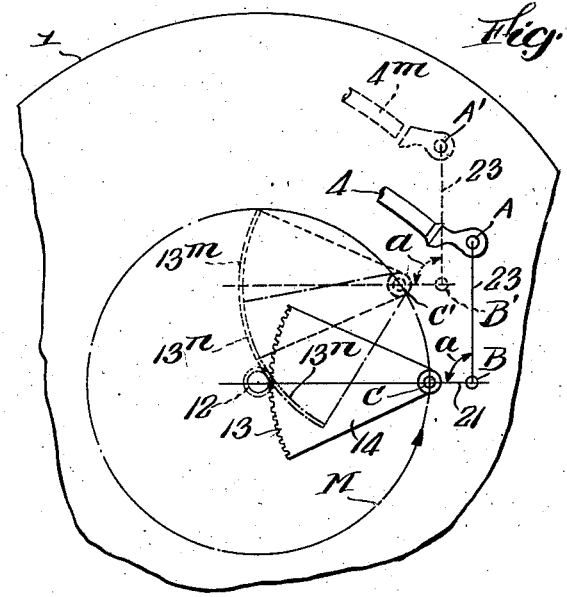
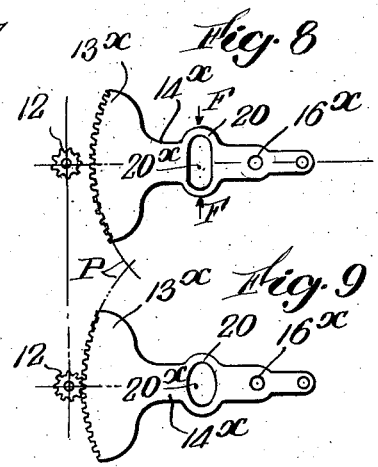
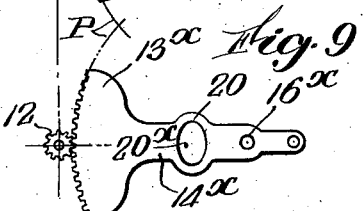
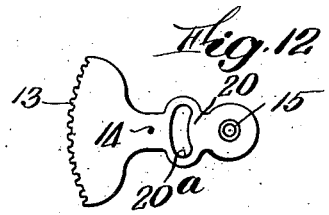
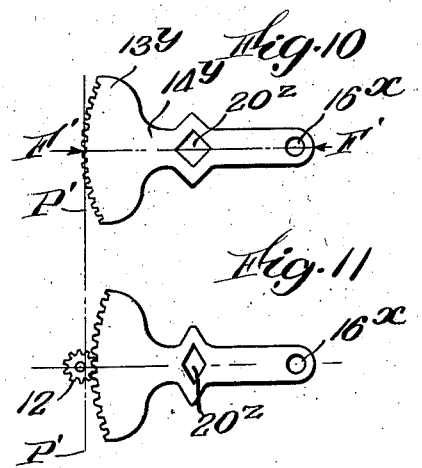
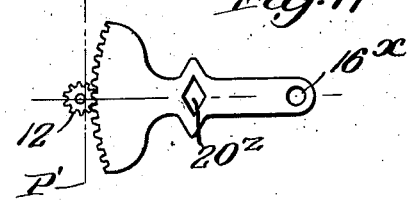
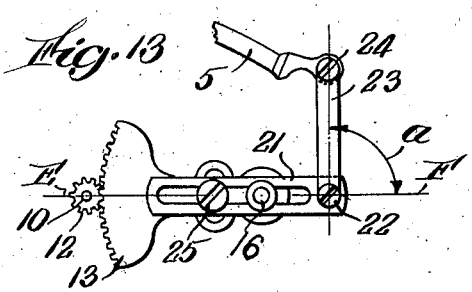
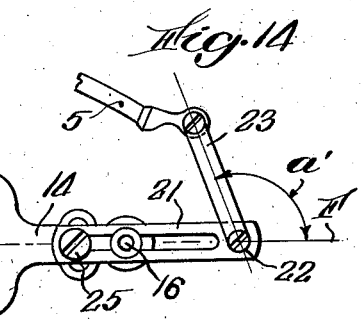
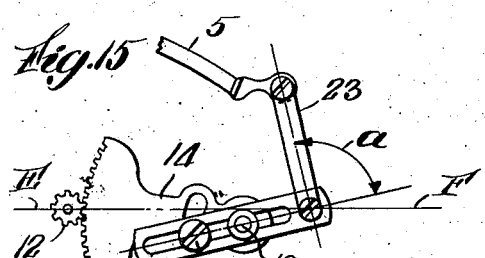
Inventor:
Frank H. Hopkins.
by Roberts Cushman Woodbury
Attys.

Patented Dec. 27, 1938

2,141,211

UNITED STATES PATENT OFFICE 2,141,211

GAUGE

Frank H. Hopkins, Bridgeport, Conn., assignor, by mesne assignments, to Manning, Maxwell & Moore, Incorporated, New York, N. Y., a corporation of New Jersey Application May 10, 1937, Serial No. 141,630

21 Claims. (Cl. 73—109)

This invention pertains to pressure gauges, and while of broader utility, it is herein illustrated and described by way of example as embodied in a gauge of the Bourdon tube type. The invention constitutes an improvement upon that disclosed in the patent to Hopkins No. 1,484,068, dated February 19, 1924, and relates more particularly to improved means to facilitate adjustment of the gauge parts during the process of manufacture for the purpose of insuring accurate readings over substantially the entire scale of the instrument.

In gauges of the Bourdon tube type the gauge movement usually comprises a pivoted sector lever having a gear sector at one end for engagement with a pinion on the index staff and having its opposite end connected by means of a link to the free end or tip of the Bourdon tube from which the force is derived for actuating the gauge movement. The tip or free end of the Bourdon tube moves in an arcuate path in response to internal pressure variations, and if the tube be well designed and constructed the movement of the tip of the tube is in substantially direct ratio to the pressure changes. However, by reason of the fact that the movement of the tube tip is transmitted by means of a link connection to the end of a pivoted lever and that the angle between the lever and link constantly changes as the pressure varies, the arc of movement of the lever is not the same at all parts of its swing for a given pressure change, and thus, if the scale be uniformly graduated, the index may not give accurately correct readings at all parts of the pressure range. However, by proper design and adjustment of the parts, a very close approximation to strict accuracy may be secured. For example, assuming that the tip of the Bourdon tube occupies its mid-position (corresponding to a position of the index midway the ends of the scale) it is possible, by selecting the proper length of link and sector lever, to establish such an angle (the "best" angle) between these parts (when the tip of the tube is at its mid-position as aforesaid) that for equal changes in pressure above or below this point, the angle between the link and lever will increase or decrease, respectively, in such a way that the lever will swing through substantially equal arcs for corresponding increments or decrements of pressure, at least throughout the major part of its path of movement. Thus even though at the extreme upper and lower limits of the scale the readings may not be absolutely accurate, they are near enough right for practical purposes, while throughout the central portion of the scale, which may be regarded as the working part of the instrument, the readings are substantially correct. For example, if the link and lever be so proportioned and arranged as to make substantially a right angle when the tip of the tube is in the mid-position, the parts are then in the best relative position for effective transmission of force from the tube to the lever. Such an arangement is desirable from the standpoint of mechanical efficiency, and such an angle so closely approximates the "best" angle, in gauges otherwise properly designed, that as the tip of the tube moves in one direction or the other from its mid-position, the lever swings to one side or the other of its mid-position through angles which are nearly in direct ratio to the movement of the tube tip, at least throughout the major part of the path of movement of the lever. Although a right angle may in many cases approximate the "best" angle, this is not always true, although it is cited as an example, but for gauges of a given design there may always be found, by trial and error methods, at least, a "best" angle between the link and lever at mid-position of the tube tip such as, with perfection of mechanical parts, to give gauge readings which are closely approximate to the true readings throughout the working parts of the scale. However, as pointed out in the aforesaid Hopkins patent, gauge manufacturers are confronted with many difficulties, from the practical standpoint, in the manufacture of gauges by production methods, if it be desired to produce gauges of any substantial accuracy. For instance, the manufacturer is under the necessity of providing different sizes of case and movement; different lengths and diameters of Bourdon tube for the several sizes of gauge; and uncontrollable variations in elasticity of Bourdon tubes, even when intended to be of the same dimensions and to have the same characteristics, as well as the difficulty of disposing the tip of the tube always in the same exact location with respect to the axis of the index staff in mounting the tube upon its support in the gauge case or in mounting the movement in the case. In view of such variations in the sizes and locations of the parts, it was formerly necessary for the manfacturer to provide himself with links of a great variety of lengths, whereby to connect the tip of the tube to the segment lever of the gauge movement after the latter had been mounted in the case, and these variations in size and location of parts substantially precluded the arrangement of the link and lever always at the best angle, with the result that to obtain any real accuracy it was necessary to calibrate each individual gauge after assembly.

In the Hopkins patent it is pointed out that by mounting the entire gauge movement so as to be capable of swinging about the index staff as an axis, many of the prior manufacturing difficulties may be overcome and the parts may be arranged at the "best" angle although using links of standard length, thus insuring a high degree of accuracy and at the same time reducing manufacturing costs and difficulties.

However, such swinging of the gauge movement as is provided for in the Hopkins patent, whereby to establish the "best" angle between the link and lever, results in a bodily movement of the staff on which the sector lever is mounted, and under extreme conditions this may so shift the sector lever as actually to disengage the sector from the pinion while in its mid-position, or at least so displace it that it will disengage the pinion at one or the other extremity of the pressure range. To avoid this difficulty it has heretofore been proposed to make the sector long enough to insure its proper meshing with the pinion at all settings and throughout the entire pressure range, but this adds to the cost of production and unduly increases the mass of the moving parts so that the sensitivity of the gauge is reduced, which is highly undesirable especially in gauges designed for low pressure ranges.

While the manufacturer of high class gauges endeavors to make the gauge parts to accurate dimensions, the competitive price of such gauges is such as to preclude any refinement of manufacturing methods comparable to those employed in making fine watches or other instruments of precision. Thus it is sometimes found, in assembling a gauge movement, that the pitch diameter of the sector or of the pinion or both is inaccurate to the extent that the teeth of the pinion and sector mesh too loosely or too tightly for smooth and accurate operation. While it has sometimes been attempted to correct this difficulty by bending the frame of the gauge movement or the staff which carries the sector, it is obvious that neither of these methods can be accurate or dependable and that at best they are crude and makeshift in character.

Among the objects of the present invention are to provide a gauge movement of improved construction and in particular to provide an improved sector lever particularly useful in gauges having an adjustable movement such as that of the Hopkins patent, and permitting the parts to be initially set at the "best" angle whereby to insure high accuracy of operation, but without necessitating the use of a sector of abnormal length to insure proper mesh of the sector and pinion under all conditions. A further object is to provide a sector of such character that its pitch diameter may readily be varied in a very simple, inexpensive but accurate way so that it may be made to mesh smoothly and accurately with the pinion and without resort to any such crude expedients as bending the frame or staff.

Other objects and advantages of the invention will be pointed out hereafter in the following more detailed description and by reference to the accompanying drawings, wherein—

Fig. 1 is a front elevation of a gauge embodying the present invention, the dial and index being removed;

Fig. 2 is a fragmentary horizontal section substantially on the line 2—2 of Fig. 1, with certain parts omitted;

Fig. 3 is a fragmentary front elevation to large scale, showing the gauge movement removed from the case, and illustrating that embodiment of the invention which is shown in Fig. 1;

Fig. 4 is a view similar to Fig. 3, but showing a modified construction;

Fig. 4a is a detailed view to smaller scale showing the sector arm of the mechanism of Fig. 4 separated from the other parts;

Fig. 5 is a view similar to Fig. 4, but illustrating a further modification;

Fig. 6 is another view similar to Fig. 4 showing a still further modification;

Fig. 7 is a diagrammatic view illustrative of the purpose of the present invention;

Figs. 8 and 9 are plan views of a sector lever embodying one feature of the present invention and illustrating how the pitch diameter of the sector gear may be varied;

Figs. 10 and 11 are views similar to Figs. 8 and 9, but illustrating a slight modification;

Fig. 12 is a plan view of the gear sector arm of the sector lever of Figs. 1 to 3; and Figs. 13 to 15 inclusive are views illustrating the principle of the invention as applied to a mechanism such as that of Figs. 1 to 3.

Referring to the drawings, the numeral 1 (Fig. 1) designates the case of the gauge, such case being of usual construction and having within it the fixed support or bracket 2 provided with the externally projecting nipple 3. The Bourdon tube 4 is fixedly secured at its lower end to the bracket 2 and is curved in the usual manner, more or less following the contour of the interior of the case, with its free end or tip 5 in the upper right-hand part of the case.

The gauge movement 6 is generally of usual type, but in accordance with the disclosure of the patent to Hopkins No. 1,484,068, the entire movement is supported upon a plate 7 having arcuate slots 8 concentric with the index staff of the gauge so that the movement may be swung about the axis of the index staff, suitable fastening means, such as the screws 9, being provided for holding the movement in its adjusted position.

The gauge movement comprises the index staff 10 provided with a hairspring 11 and carrying the pinion 12 which meshes with the sector gear 13. This sector gear 13 (Fig. 12) is formed at one end of a sector gear arm 14 which is provided at its opposite end with an opening 15 which receives the sector staff 16 (Fig. 2). This staff is preferably provided with an integral enlargement or boss 17, which forms an abutment for the sector gear arm 14. Forwardly of this member 17 the sector staff is screw threaded, as shown at 18, for the reception of a nut 19, by means of which the sector lever may be clamped firmly against the abutment 17 so as to turn with the sector staff 16. Intermediate the gear 13 and the opening 15, the arm 14 is provided with an enlargement 20 (Fig. 12) which affords space for an arcuate transversely extending slot 20a which is curved concentrically with the axis of the opening 15.

The sector lever as a whole comprises the arm 14 and also a tail piece or slide member 21 (Fig. 3). This tail piece or slide member is separate from and independent of the lever arm 14 and is furnished with a longitudinally extending slot 22 through which passes the sector staff 16. The tail piece is furnished at its outer or right-hand end, as viewed in Fig. 3, with a screw-threaded opening for the reception of a shoulder screw 22 forming a pivotal connection between the tail piece 21 and the link member 23 by means of which force is transmitted to the sector lever from the movable free end or tip 5 of the Bourdon tube. As usual the tip of the tube is furnished with a bracket member 25a and the upper end of the link 23 is pivotally secured to this bracket by means of a shoulder screw 24.

A bolt 25 extends through the slot 22 of the tail piece 21 and through the curved slot 20a of the arm 14, and is provided at its rear end with a nut 26. By loosening the nuts 19 and 26 the tail piece 21 may be moved lengthwise with respect to the arm 14, or may be swung about the axis of the sector staff 16 relatively to the arm 14. After adjustment, the parts 14 and 21 may be clamped together by tightening the nuts 19 and 26.

In Figs. 4 and 4a a modified construction is illustrated wherein the lever 14a, which carries the sector 13a, is of conventional type, having the opening 15a for the sector staff and being provided with a pair of screw-threaded openings 27 for the reception of clamping screws 25m by means of which the tail piece 21a may be clamped to the arm 14a. In this instance the tail piece 21a, as a whole, can only be moved in a lengthwise direction as respects the arm 14a, but this tail piece 21a is furnished with a laterally offset integral arm 28 provided at its free extremity with a head 29 having a screw-threaded opening for the reception of the shoulder screw 22, by means of which the link 23 is attached to the tail piece. The arm 28 may be bent so as to diverge more or less from the main body of the tail piece 21a, thus moving the axis of the screw 22 toward or from the longitudinal center line of the lever arm 14a. In Fig. 4 one position of the arm 28 is indicated in full lines, while another position of the arm 28 and the corresponding relative position of the sector gear 13a are indicated in broken lines.

In Fig. 5 a further modification is illustrated, generally similar to that of Fig. 4, but in which the tail piece 21b is furnished at its right-hand end with an enlargement or head 29 having a central opening 30 into which projects the integral tongue 31 having an opening at its free end for the reception of the shoulder screw 22. The tongue 31 is capable of being bent and thus the axis of the screw 22 may be moved to one side or the other of the longitudinal axis of the sector lever.

In Fig. 6 a further modification is illustrated, generally similar to that of Figs. 4 and 5, but in which the tail piece or slide member 21c is furnished with a hairpin bend 32 at its right-hand end, having a head 33 to which the pivot pin 22 is secured. In this arrangement the part 32 of the tail piece may be bent so as to move the axis of the pivot pin 22 to one side or the other of the longitudinal axis of the sector lever.

As above pointed out, slight and inevitable inaccuracies in commercial manufacture sometimes result in a failure of the sector gear and the pinion to mesh properly when the parts are assembled. This may, for example, be due to the fact that the pitch diameter of the sector gear is a little too large or too small. By the arrangement illustrated in Figs. 8 and 9, for example, such an error may readily be corrected as an incident to the assembly operation, provided the gear-carrying arm 14x of the sector lever be provided with an opening such, for example, as the opening 29x (Fig. 8), intermediate the sector staff opening 16x and the pitch circle P of the sector gear 13x. For example, if as shown in Fig. 8, a transversely elongate opening 20x be provided (which may be the opening 20a of Fig. 12) and if it be found that the pitch diameter of the sector gear is too small for proper intermesh with pinion 12, correction may easily be made by applying force in the direction shown by the arrows F to the opposite end walls of the opening 20x, such as to decrease the transverse length of the opening 20x and increase its width, as shown in Fig. 9 thus in effect lengthening the arm 14x. Ordinarily the error in the pitch diameter of the sector gear will be of the order of a few one-thousandths of an inch so that the above-described method of increasing the pitch diameter may readily be accomplished without introducing any substantial deviation of the gear from a true circular arc.

In Figs. 10 and 11 the reverse operation is illustrated wherein the initial pitch diameter $P^1$ of the sector gear is shown as too great. In this instance the arm 14y is provided with an opening 20z and by applying force in the direction indicated by the arrows $F^1$ this opening 20z may be transversely elongated, as shown in Fig. 11, thus in effect contracting the length of the lever arm 14y and so reducing the pitch diameter of the gear as to permit it properly to mesh with pinion 12.

Reverting to Fig. 7, the principle of operation of the construction illustrated in Figs. 1 to 3 is indicated in a diagrammatic manner. Thus in this view, the pinion 12 and the sector gear 13, as well as the tip of the Bourdon tube 4, are indicated in what may be designated the mid-position of the parts, that is to say, with the tip of the tube at the position which it occupies when the index is at the mid-point of the scale. The sector arm 14 is indicated diagrammatically, as well as the tail piece 21, and the link 23, it being noted that in this position of the parts the angle $a$ between the link 23 and the tail piece 21, is substantially a right angle. In the further discussion it will be assumed that this is the "best" angle between these parts at the mid-position of the Bourdon tube tip to give uniformity of movement of the pointer throughout the length of the scale. It is further assumed that the position of the tube tip, as shown in full lines, is that which might ordinarily be expected when the tube conforms to the most accurate dimensions and is mounted with the greatest precision and care in the case. It is further assumed that the length of the link 23 has been fixed as a standard, in accordance with the assumed position of the tip of the tube under ideal conditions, as above outlined. It is further understood that the point C, which indicates the axis of the sector staff, may be moved in the circular arc M by swinging the gauge movement about the axis of the index staff.

Now if in a given instance, it be found in assembling the parts that instead of occupying the full line position 4, the tip of the tube occupies the dotted line position $4^m$, it is evident that if a standard length link 23 is to be employed and if the angle $a$ between the link and the tail piece 21 is to be preserved, the sector staff must be moved by swinging the gauge movement from the position C to the position $C^1$. However, with the sector gear arm 14 and the tail piece 21 (shown in dotted lines) in the same relative positions as shown in full lines, the sector gear at 13^m does not engage the pinion 12 at all. Ordinarily such an extreme condition would not be met with in practice (although it might frequently happen that the sector gear would contact with the pinion very near the end of the sector after such adjustment of the gauge movement). In accordance with the present invention, the above difficulty is readily corrected merely by loosening the arm 14 and swinging it relatively to the tail piece 21 so as, for example, to occupy the broken line position indicated at 13^n in Fig. 7, wherein the central part of the gear now engages the pinion 12 as it should when the tip of the Bourdon tube is in its mid-position. However, although the sector gear now occupies the position shown at 13^n, the tail piece 21 still makes the angle $a$ with the link 23. Thus, any movement of the tip of the tube from its mid-position is transmitted most effectively to the sector lever to obtain uniformity of reading throughout the length of the scale, while at the same time proper engagement of the sector gear with the pinion throughout such range of movement is assured.

While in the above description the swinging of the sector gear arm 14 relatively to the tail piece 21 has been suggested as the means for remedying the condition illustrated at 13^m, it is obvious that the movement of the parts 14 and 21 is a relative movement and that instead of moving the parts first to the position shown in dotted lines and then swinging the sector arm down to the position 13^n, the sector gear may be held in engagement with the pinion after loosening the arm 14 from the tail piece and then the gauge movement may be swung so as to carry the tail piece and the sector staff to the new position without disengaging the sector gear from the pinion during such movement.

In Figs. 13 to 15 the operations involved in the adjustment of the actual parts are indicated. As shown in Fig. 13, for ease in description, the tip 5 of the tube 4 occupies the ideal mid-position. At the same time the central part of the sector gear 13 engages the pinion 12 and the sector lever as a whole is at its minimum length, and the link 23 makes an angle of substantially 90° with the center line E, F connecting the sector staff 16 and the index staff 10.

If now, in attempting to assemble the parts, it be found that the tip 5 of the Bourdon tube actually occupies some other position, as illustrated in Fig. 14, it may be found necessary first to slide the tail piece outwardly, as shown in Fig. 14, so as in effect to lengthen the sector lever, and thereby permit the link 23 of standard length to connect the tail piece to the tube. However, having made this adjustment, it is now found that the angle $a'$ is no longer a right angle. To restore the desired angularity between the link 23 and the tail piece or actuating arm of the lever, the tail piece is now swung about the axis of the sector staff 16 as a center to some such position as shown in Fig. 15, while at the same time the movement as a whole is swung about the center of the index staff so that the axis of the sector staff no longer lies in the horizontal lines E, F. The sector arm 14 is now swung about its connection to the sector staff 16 so as to bring the central part of the sector gear 13 into mesh with the pinion 12. The nuts 19 and 26 are now tightened, thus fixedly clamping the tail piece to the arm 14. As thus adjusted the angle $a$ is the desired "best" angle, while the sector gear properly meshes with the pinion 12.

In the arrangement shown in Figs. 4, 5 and 6, desirable results may be obtained by bending the members 28, 31 or 33, respectively, but since in so bending these parts the axis of the pivot screw 22 does not swing in a circular arc about the axis of the sector staff, the adjustment is not necessarily quite so accurate as that produced by the arrangement shown in Figs. 1 to 3, although approximate results of practical utility under most conditions may be obtained by this simpler construction of Figs. 4, 5 and 6.

While certain desirable embodiments of the invention have been illustrated by way of example, it is to be understood that the invention is not necessarily limited to these precise constructions but is to be regarded as inclusive of all equivalent arrangements and modifications which fall within the scope of the appended claims.

I claim:

1. A pressure gauge of the kind in which a pressure-responsive element, mounted on a support, has a movable part connected by a link to a sector lever mounted on a staff and constituting an element of a gauge movement including an index staff having thereon a pinion which meshes with a gear sector on the sector lever and in which the gauge movement is mounted upon a support with provision for angular adustment about the axis of the index staff, characterized in that the sector lever is so constructed and arranged that the point of connection of the link to the lever is adapted to be adjusted in a path extending transversely of the length of the lever whereby the link and lever may initially be set at substantially the best angle while using a link of standard length and a segment of normal dimensions so as to insure accurate readings throughout substantially the entire pressure range.

2. A pressure gauge of the kind in which a pressure-responsive element mounted in a case has a movable part connected by a link to a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that that portion of the sector lever to which the link is connected is independent of and angularly adjustable with respect to that arm of the lever which carries the gear sector whereby the parts may initially be set to insure substantial accuracy of reading throughout the entire range of the instrument, and in having means for holding said parts of the sector lever in adjusted position.

3. A pressure gauge of the kind in which a pressure-responsive element, mounted in a case, has a movable part connected by a link to a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that that portion of the lever to which the link is connected is so constructed and arranged that the point of connection of said tail portion of the lever to the link is adapted to be adjusted angularly about the axis of the sector staff relatively to that part of the lever which carries the sector gear whereby, while using a link of standard length and a segment of normal dimensions, the parts may be so set during the process of manufacture as to insure accurate readings throughout substantially the entire pressure range.

4. A pressure gauge of the kind in which a pressure-responsive element, mounted in a case, has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that the tail portion and that part of the sector lever which carries the sector gear are independent of one another and relatively angularly adjustable about the axis of the sector staff whereby, while using a link of standard length and a segment of normal dimensions, the parts may be so set during the process of manufacture as to insure accurate readings throughout substantially the entire pressure range, and in having means for holding said portions of the lever in selected position of angular adjustment.

5. A pressure gauge of the kind in which a pressure-responsive element, mounted on a support, has a movable part connected by a link to the tail portion of a sector lever mounted on a staff and constituting an element of a gauge movement including an index staff having thereon a pinion which meshes with a gear sector on the sector lever and in which the gauge movement is mounted upon a support with provision for angular adjustment about the axis of the index staff, characterized in that the tail portion and that part of the sector lever which carries the sector gear are relatively adjustable about the axis of the sector staff whereby the parts may initially be set to insure substantial accuracy of reading throughout the entire range of the instrument, one of said parts of the lever having an arcuate slot coaxial with the axis of the staff, and the other of said parts having a holding element projecting into said slot.

6. A pressure gauge of the kind in which a pressure-responsive element mounted in a case has a movable part connected by a link to the tail portion of a sector lever mounted on a staff, and constituting an element of a gauge movement including an index staff having thereon a pinion which meshes with a gear sector on the sector lever and in which the gauge movement is mounted in the case with provision for angular adjustment about the axis of the index staff, characterized in that that portion of the sector lever which carries the sector gear is fast to the sector staff while the tail portion of the sector lever is angularly adjustable about the axis of the sector staff whereby the link and lever may initially be set at substantially the best angle while using a link of standard length and a segment of normal dimensions so as to insure accurate readings throughout substantially the entire pressure range, and in having means for holding said parts of the lever in selected position of relative adjustment.

7. A pressure gauge of the kind in which a pressure-responsive element mounted in a case has a movable part connected by a link to the tail portion of a section lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that that part of the sector lever which carries the sector gear is fixed to the sector staff, and in that the tail portion of said lever is adjustable lengthwise and also angularly about the axis of the sector staff whereby the parts may initially be set to insure substantial accuracy of reading throughout the entire range of the instrument, and means for fixedly uniting the tail portion to the gear-carrying portion of the sector lever in any desired position of adjustment.

8. A pressure gauge of the kind in which a pressure-responsive element, mounted upon a support, has a movable part connected by a link to the tail portion of a sector lever mounted on a staff and constituting an element of a gauge movement including an index staff having thereon a pinion which meshes with a gear sector on the sector lever and in which the gauge movement is mounted upon a support with provision for angular adjustment about the axis of the index staff, and wherein the tail portion of the lever is movable lengthwise relatively to the axis of the sector lever whereby to adjust the effective length of said tail portion, characterized in that the tail portion of the lever is so constructed and arranged that the point of connection of the tail portion of the lever to the link is adapted to be adjusted transversely relatively to that part of the lever which carries the sector gear whereby, while using a link of standard length and a segment of normal dimensions, the parts may be so set during the process of manufacture as to insure accurate readings throughout substantially the entire pressure range.

9. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that that part of the sector lever which carries the sector gear is fixed to the sector staff, and in that the tail portion of the lever has a longitudinally extending slot through which the sector staff passes, the tail portion being adjustable lengthwise and also being capable of swinging about the axis of the sector staff whereby the link and lever may initially be set at substantially the best angle while using a link of standard length and a segment of normal dimensions so as to insure accurate readings throughout substantially the entire pressure range, the gear-carrying portion of the lever having an arcuate slot concentric with the axis of the staff, and a bolt passing through the slot in the tail member and the arcuate slot in the other portion of the lever, said bolt being operative to hold said parts of the lever in selected position of relative adjustment.

10. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that the tail portion of the sector lever has a longitudinal slot which receives the sector staff so that the tail portion may be moved lengthwise and also swung angularly about the axis of the sector staff whereby the parts may initially be set to insure substantial accuracy of reading throughout the entire range of the instrument, the part of the sector lever which carries the sector gear being fixed to the staff, and in having means for holding the tail portion of the lever in selected position of adjustment both longitudinally and angularly with reference to the other part of the lever.

11. A sector lever for use in Bourdon tube gauges, said lever comprising a gear-carrying arm having a segment gear at its free end, and a tail portion provided at its free end with means for pivotally connecting an actuating link thereto, the tail piece being independent of the gear-carrying arm and movable angularly with reference to the latter about the axis of the lever, one of said relatively movable parts having a transverse arcuate slot therein and the other of said parts having a clamping bolt which projects into said slot.

12. A sector lever for use in Bourdon tube gauges, said lever comprising a gear-carrying arm having a segment gear at its free end, and a tail portion provided at its free end with means for pivotally connecting an actuating link thereto, the tail piece having an elongate longitudinally extending slot, and the gear-carrying arm having a transverse arcuate slot coaxial with the pivotal axis of the lever, a bolt extending through both slots for clamping the arm and tail piece in adjusted position, the tail piece being adjustable both in the direction of its length and also angularly with reference to the gear-carrying arm.

13. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that the tail portion of the lever includes a bendable element to which the link is pivotally connected, so that the point of connection of the link to the lever may be adjusted transversely of the length of the lever whereby the link and lever may initially be set at substantially the best angle while using a link of standard length and a segment of normal dimensions so as to insure acurate readings throughout substantially the entire pressure range.

14. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that the tail portion of the lever has a bendable arm to the free end of which the link is pivotally connected, said free end being adapted to be adjusted transversely of the lever by bending the arm whereby the parts may initially be set to insure substantial accuracy of reading throughout the entire range of the instrument.

15. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, and wherein the tail portion of the lever is bodily movable lengthwise relatively to the gear-carrying portion of the lever, thereby to vary the effective length of the tail portion, characterized in that the tail portion has an integral bendable arm to the free end of which the link is pivotally united, so that the point of connection of the link to the tail portion of the lever is adapted to be adjusted transversely of the lever by bending said arm whereby the link and lever may initially be set at substantially the best angle while using a link of standard length and a segment of normal dimensions so as to insure accurate readings throughout substantially the entire pressure range.

16. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that the tail portion of the lever has a laterally divergent bendable arm to which the link is pivotally connected, so that the point of connection of the link to the lever is adapted to be adjusted transversely of the lever by bending said arm whereby, while using a link of standard length and a segment of normal dimensions, the parts may be so set during the process of manufacture as to insure accurate readings throughout substantially the entire pressure range.

17. A pressure gauge of the kind in which a pressure-responsive element mounted in a case has a movable part connected by a link to the tail portion of a sector lever mounted on a staff and constituting an element of a gauge movement including an index staff having thereon a pinion which meshes with a gear sector on the sector lever and in which the gauge movement is mounted in the case with provision for angular adjustment about the axis of the index staff, characterized in that the tail portion of the lever has an integral arm whose free end is directed toward the sector staff and which is adapted to be adjusted transversely of the lever in an arcuate path by bending the arm, and means pivotally connecting the link to the free end of said arm whereby the link and lever may initially be set at substantially the best angle while using a link of standard length and a segment of normal dimensions so as to insure accurate readings throughout substantially the entire pressure range.

18. In a gauge of the Bourdon tube type having a gauge movement including an index staff provided with a pinion, and a sector lever having a sector gear which meshes with the pinion, characterized in that that portion of the lever which lies between the pitch circle of the gear and the axis of the lever is of variable length, whereby, by variation of the length of said portion of the lever, the effective pitch diameter of the gear may be varied.

19. In a gauge of the Bourdon tube type having a gauge movement including an index staff provided with a pinion, and a sector lever having a sector gear which meshes with the pinion, characterized in that the arm of the sector lever which carries the gear is widened intermediate the pitch circle of the gear and the axis about which the arm turns, said wider portion having an opening therethrough whereby, by relative movement of the walls of said opening, the pitch diameter of the gear may be varied.

20. In a gauge of the Bourdon tube type having a gauge movement including an index staff provided with a pinion, and a sector lever having a sector gear which meshes with the pinion, characterized in that the arm of the lever which carries the segment gear has an opening intermediate the pitch circle of the gear and the axis of the lever, said opening having outwardly bowed lateral walls whereby, by relative movement of said walls, the effective pitch diameter of the gear may be varied.

21. In a gauge of the Bourdon tube type having a gauge movement including an index staff provided with a pinion, and a sector lever having a sector gear which meshes with the pinion, characterized in that that arm of the lever which carries the segment gear has an arcuate slot, coaxial with the lever, disposed between the pitch circle of the gear and the axis of the lever, the tail portion of the lever being movable angularly about the axis of the lever as a center, and a bolt which passes through said arcuate slot and into the tail portion for holding the latter in adjusted position relatively to the gear-carrying arm, the effective pitch diameter of the gear being adjustable by relative movement of the end walls of said arcuate slot.

FRANK H. HOPKINS.